Sept. 23, 1969     T. C. WARREN     3,468,487

VARIABLE THRUST INJECTOR

Filed Feb. 28, 1966

INVENTOR.
TOM C. WARREN

BY C. E. Vautrain Jr. AGENT

ATTORNEY

United States Patent Office
3,468,487
Patented Sept. 23, 1969

3,468,487
VARIABLE THRUST INJECTOR
Tom C. Warren, Sunnyvale, Calif., assignor, by mesne assignments, to the United States of America as represented by the Secretary of the Navy
Filed Feb. 28, 1966, Ser. No. 532,530
Int. Cl. B05b 7/10
U.S. Cl. 239—403                6 Claims

ABSTRACT OF THE DISCLOSURE

A method of, and apparatus for, injecting liquid propellant into a reaction motor in the form of liquid sheets of ingredients such as fuel and oxidizer, respectively, each sheet being of conical configuration and arranged to converge at different points along a common axis, the mixing of the fuel and oxidizer occurring at the intersection of the two sheets. Each sheet so formed may optionally be swirled in the same or opposite directions, and by employing a plurality of injector manifolds for each liquid ingredient the propellant flow rate may be reduced when the motor is operated at low thrust ranges.

---

Figure 1:
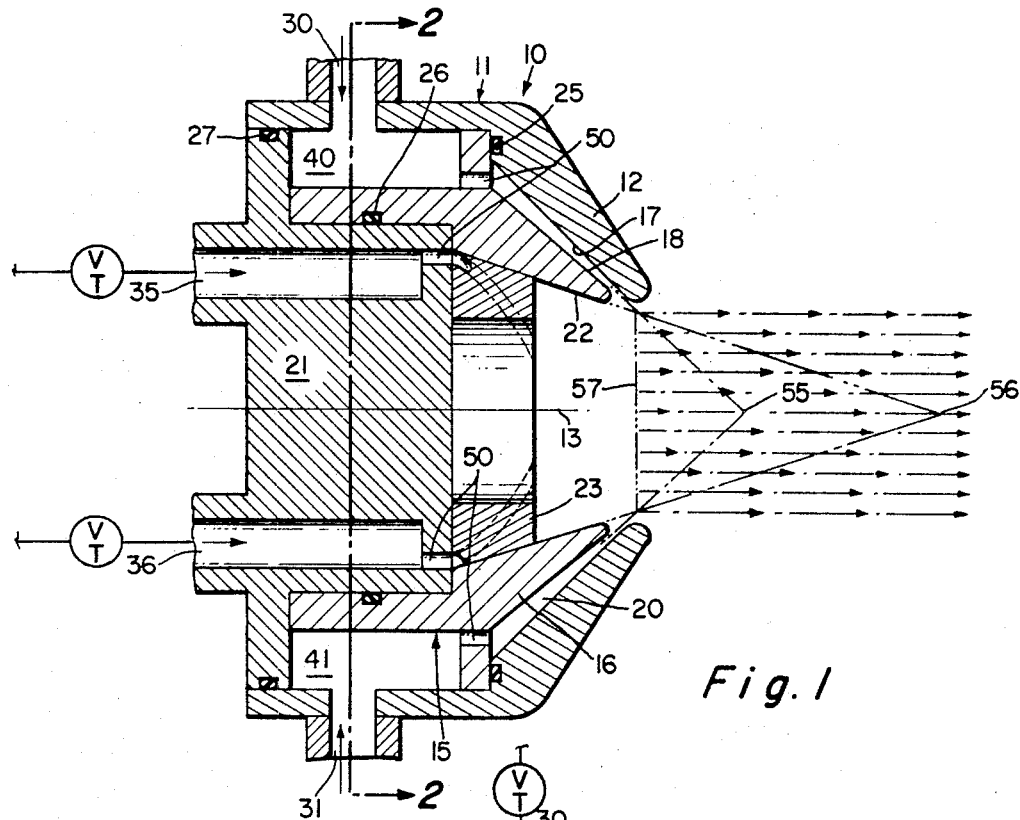

The invention described herein may be manufactured and used by or for the Government of the United States of America for governmental purposes without the payment of any royalties thereon or therefor.

This invention relates to thrust modulation and more particularly to such modulation in liquid propellant motors by varying the flow rate through the combination of line throttling, a dual manifold injector and a unique injector configuration.

Many types of injectors have been used in liquid propellant rocket engines with varying degrees of success. Examples of some of the prior types of injectors are the impinging jet (doublet) injector, the self-impinging, countersunk repetitive injector and the early nonimpinging injector made up of a multiplicity of pods. Common types of orifice pattern arrangements in present use include the doublet, self-impinging, shower head, triplet, splash plate and concentric tube. The doublet pattern is difficult to produce but works well with propellants which require fast mixing and liquid-phase reaction for good performance such as hypergolic propellants. The triplet pattern works satisfactorily under proper operating conditions but enlarges the disadvantages of the doublet type. The splashplate type performs with excellence under some conditions but is difficult to produce and usually has high overall heat transfer rates. The concentric tube injector type is capable of high performance and stable combustion when combined with low injector pressure drop for some hypergolic propellants. The self-impinging pattern may be used with either hypergolic or nonhypergolic propellants, is flexible and operates satisfactorily over a wide range of operating variables. The shower head injection pattern is hard starting, gives low performance and is subject to combustion instability when used with propellant combinations other than hydrogen and oxygen.

Thrust modulation in the various types of injectors may be attained in any of several ways two of which are varying the thrust chamber throat area and varying the propellant flow rate to the thrust chamber. Some of the methods of flow rate variations presently practiced involve changing the injector orifice area by mechanical means, changing by propellant aeration the propellant density, line throttling the propellants upstream of the injector and combining line throttling with a dual manifold injector consisting of two pairs of fuel and oxidizer manifolds. Mechanical variation of the injector orifice area has the advantage of allowing a wide range of flow rates without adversely affecting the injector pressure drop and injection velocity but is subject to considerable disadvantages including a complex injector, sealing, and maintaining constant moving clearances particularly during hot firing operation. Changing propellant density by propellant aeration requires injecting a gas into the liquid propellants so that the mass flow rate can be varied without causing undesirable changes in the injector pressure drop and injection velocity. Extremely wide thrust range with satisfactory performance are offset by disadvantages including the requirements of a gas supply, metering and control devices, and a complex injector design capable of successfully mixing the gas with the liquid propellants. Upstream line throttling permits the use of conventional injector designs and line throttling devices but severely limits the thrust range due to a drastic change in injector pressure drop an injection velocity. In the combined line throttling with dual manifold injector method, the thrust range is limited to substantially 12 to 1 before the injector pressure drop variation becomes prohibitive and the injection velocity variation adversely affects performance. Disadvantages include a moderately limited thrust range and a complex and costly injector where a conventional flat face injector having a duo-doublet, doublet or triplet impinging pattern is used. The present invention overcomes the disadvantages of prior methods of obtaining thrust modulation by providing a variable thrust injector using the dual manifold and line throttling technique in combination with a simplified, unique injector configuration.

Accordingly, it is an object of the present invention to provide a method of and means for attaining thrust modulation which includes the combination of a simplified injector with dual manifold and line throttling techniques.

Another object of the invention is to provide a method of and means for attaining thrust modulation through a device which is compact and may be made by using conventional machining and casting techniques.

A further object of the present invention is to provide a method of and means for attaining thrust modulation through a device having interchangeable components.

A still further object of this invention is to provide a method of and means for attaining thrust modulation by which high performance is achieved over a wide thrust range.

A further object of the invention is to provide a method of and means for attaining thrust modulation wherein complete separation of fuel and oxidizer is maintained within the device.

Figure 2:
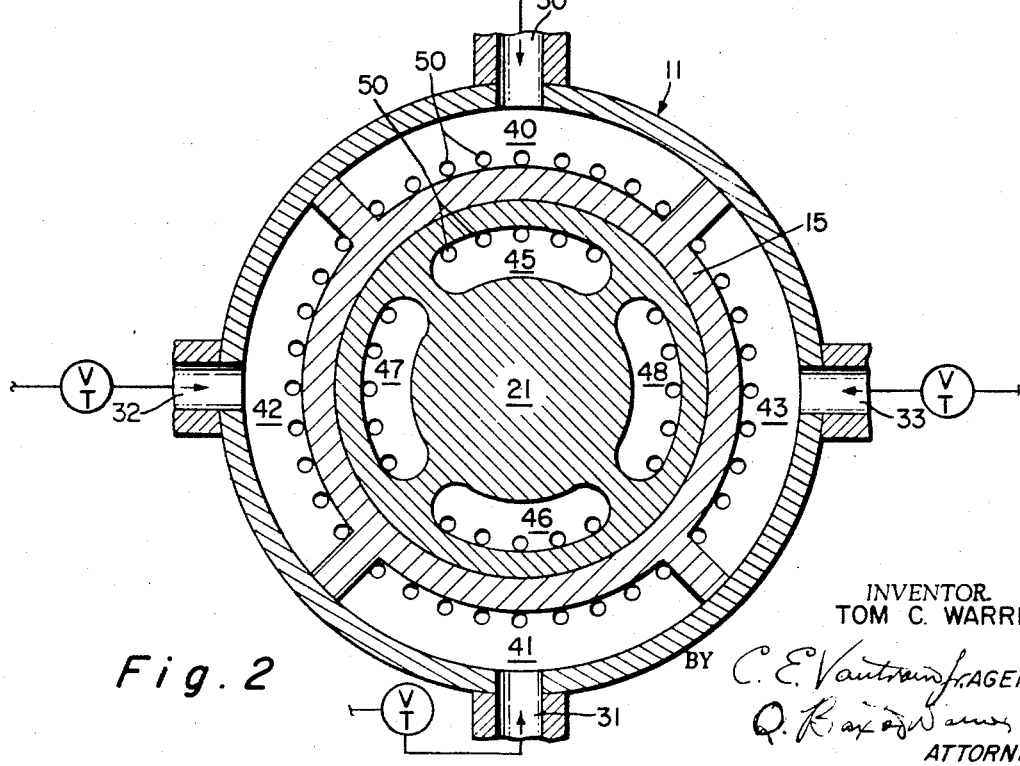

Other objects and many of the attendant advantages of this invention will be readily appreciated as the same becomes better understood by reference to the following detailed description when considered in connection with the accompanying drawings in which like numerals represent like parts throughout and wherein:

FIG. 1 is a vertical longitudinal sectional view of one embodiment of the present invention; and FIG. 2 is a transverse sectional view taken along a line substantially corresponding to line 2—2 of FIG. 1.

Referring to the figures, the simplified injector 10 as shown in longitudinal cross section in FIG. 1 includes an annular outer housing 11 having a turned downstream wall portion 12 which converges at its downstream end toward the longitudinal axis 13 of the rocket engine nozzle. Positioned within housing 11 is a cylinder 15 having an annular converging portion 16 which converges toward axis 13 at substantially the same angle as does wall portion 12 of housing 11. The inner annular surface 17 of housing 11 is spaced from the outer annular surface 18 of cylinder 15 to provide an annular opening 20, preferably with a slight taper converging toward the axis, through which liquid propellant is directed.

Disposed partially within cylinder 15 is a central plug 21 which terminates substantially at the turn of cylinder 15 into converging portion 16. Attached to the downstream end of plug 21 is means for forming fluid into a conical sheet along surface 22 such as volute 23. Housing 11, cylinder 15 and plug 21 are sealed along appropriate lines by O-rings 25, 26 and 27. Liquid propellant supplies, are connected through lines and line throttling valves, to inlets 30, 31, 32, 33, 35 and 36. Inlets 30 and 31 connect a common supply line to manifolds 40 and 41, inlets 32 and 33 connect a common supply line to manifolds 42 and 43, inlets 35 and 36 connect a common supply line to manifolds 45 and 46 and a similar pair of inlets, not shown, connect a common supply line to manifolds 47 and 48. Fluid or liquid propellant is conducted from manifolds 40–43 and 45–48 to opening 20 and volute 23, respectively, through a plurality of orifices 50.

Opening 20 forms the liquid propellant flowing therethrough into a conical sheet whose projected apex is indicated at 55 while liquid propellant entering volute 23 is formed into a conical sheet whose projected apex is indicated at 56. Propellant mixing is accomplished at the intersection 57 of the conical sheets. The respective sheets may be formed by propellant traversing selected combinations of manifolds 40–43 and 45–48 through the operation of suitable cutoff valves, not shown, which may be included in or incorporated with the line throttling valves.

In operation, fuel is the liquid propellant preferably introduced through the outer manifolds 40–43 and oxidizer that introduced through inner manifolds 45–48. It has been determined desirable to group the manifolds in pairs which preferably are oppositely positioned such as 40–41 and 42–43 for fuel injection and 45–46 and 47–48 for oxidizer injection. These pairs preferably are further grouped according to their use as to either primary flow or secondary flow. Flow through manifolds 40–41 and 45–46 has been selected as primary flow and continues through the entire thrust range of the rocket engine. Secondary flow is effected through manifolds 42–43 and 47–48 and is initiated and maintained during the high thrust range of the rocket engine. Primary flow and secondary flow when combined with the simplified injector produce the wide thrust range which is attained by the present invention.

Propellant mixing is accomplished in the vicinity of line 57 and is particularly effective because of, among other reasons, the conical sheet emanating from volute 23 and surface 22 which diverges from an area inside the conical sheet emanating from opening 20. Either or both of the conical sheets can be swirling at the time of intersection and such swirling can be in the same direction or in opposite directions. To promote swirling through opening 20 orifices 50 in communication therewith may be skewed at the desired angle to axis 13. Thus, in FIG. 1 if the downstream end of the orifices 50 connecting with opening 20 were disposed clockwise with respect to the upstream end as seen looking downstream a clockwise swirl would be produced in the conical sheet formed by opening 20. Counterclockwise disposition of the respective ends would produce counterclockwise swirl. The swirl of the inner conical sheet may be controlled in a similar manner by selectively orienting the vanes of volute 23. If desired, the conical sheets may be deflected from splash plates, not shown, in which circumstance no centrifugal flow would occur. The outer conical sheet thus may be caused to swirl in a direction opposite to the inner conical sheet, or one or both may be directed axially or one directed axially and the other swirled in the desired direction. Swirling also may be accomplished by the insertion of a swirl cup, not shown, between manifolds 40–43 and opening 20. These options in the flow of liquid propellant provide a combination of the desirable characteristics of conventional dual manifold injectors such as good throttling range and constant performance and precise control with a simplified injector construction having few orifices and no moving parts. This injector is compact, easy to manufacture and flexible in configuration for modification by interchangeable components.

The wide throttling range of the present invention is attained by regulating the propellant flow rate through the manifold pairs in a predetermined manner. The primary manifolds for fuel and oxidizer supply the total flow rate over the low thrust range. At a point in the general range of 30% to 60% of rated thrust, in a particular motor system, flow preferably is initiated through the secondary fuel and oxidizer manifolds to augment the primary flow. When 100% of rated thrust is obtained the major portion of flow is from the secondary manifolds. The injection velocity therefore is contained within a range which is commensurate with constant performance, and the injection pressure drop remains within acceptable limits.

The novel injector configuration of the present invention is readily adaptable to small, high chamber pressure thrust chambers. This configuration permits complete injector face cooling throughout the entire thrust range.

I claim:
1. Apparatus for injecting liquid propellant into reaction motors comprising:
    a housing having an annular wall portion converging toward the longitudinal axis of the reaction motor;
    a cylinder positioned within said housing and having an annular wall portion disposed within the housing annular wall portion converging toward the axis at substantially the same angle as the housing annular wall portion;
    the space between the inner converging annular surface of said housing and the outer converging annular surface of said cylinder providing an annular opening for the passage of liquid propellant;
    outer manifold means upstream of said opening and means connected thereto for directing liquid propellant into said opening;
    said cylinder having an inner annular surface converging toward said axis such that its angle of intersection with the axis is less than the angle of intersection of said converging annular surface of said housing;
    volute means disposed within said cylinder annular converging surface; and
    inner manifold means upstream of said volute means and means connected thereto for directing liquid propellant into said volute means;
    whereby liquid propellant introduced through said outer manifold means will be formed into a first conical sheet having its apex downstream of said injector and liquid propellant introduced through said inner manifold means will be formed into a second conical sheet having an apex farther downstream than the apex of said first conical sheet.

2. The apparatus as defined in claim 1 wherein the means connecting said outer manifold and said opening are a plurality of orifices directed at selected angles with respect to said axis so as to cause selected swirling or nonswirling of the first conical sheet.

3. The apparatus as defined in claim 2 and further including line throttling means in lines connecting said outer and inner manifold means with liquid propellant supply sources for controlling the flow rate of propellant through each manifold means.

4. The apparatus as defined in claim 3 wherein said outer manifold means includes a plurality of outer manifolds;
    each outer manifold having individual line throttling means in propellant supply lines leading thereto;
    said inner manifold means including a plurality of inner manifolds; and each inner manifold having individual line throttling means in propellant supply lines leading thereto;

so that a wide throttling range of liquid propellants may be attained by regulating the propellant flow rate through said outer and inner manifolds in a selected manner.

5. The apparatus as defined in claim 4 wherein said outer manifold means and said inner manifold means are disposed in oppositely positioned pairs of outer and inner manifolds.

6. The apparatus as defined in claim 5 wherein the liquid propellant introduced through said outer manifold means is fuel and that introduced said inner manifold means is oxidizer.

References Cited

UNITED STATES PATENTS

| | | | |
|---|---|---|---|
| 2,603,535 | 7/1952 | Ipsen et al. | 239—404 |
| 2,760,335 | 8/1956 | Goddard | 60—258 |
| 2,810,259 | 11/1957 | Burdette | 60—39.74 |
| 2,896,914 | 7/1959 | Ryan | 60—258 |
| 2,972,225 | 2/1961 | Cumming et al. | 60—250 |
| 3,074,231 | 1/1963 | Klein | 60—39.74 |

SAMUEL FEINBERG, Primary Examiner

U.S. Cl. X.R.

60—39.46, 39.74, 258; 239—416.4, 41.3, 424